US012673307B2

(12) United States Patent
Schneider et al.

(10) Patent No.: US 12,673,307 B2
(45) Date of Patent: Jul. 7, 2026

(54) TUBE HOLDER

(71) Applicant: Heathrow Scientific LLC, Vernon Hills, IL (US)

(72) Inventors: Brian Paul Schneider, Crystal Lake, IL (US); Gary Dean Kamees, Bristol, WI (US)

(73) Assignee: HEATHROW SCIENTIFIC LLC, Vernon Hills, IL (US)

( * ) Notice: Subject to any disclaimer, the term of this patent is extended or adjusted under 35 U.S.C. 154(b) by 436 days.

(21) Appl. No.: 18/349,519

(22) Filed: Jul. 10, 2023

(65) Prior Publication Data

US 2025/0018353 A1 Jan. 16, 2025

(51) Int. Cl.
*B01F 29/31* (2022.01)
*B01F 29/34* (2022.01)

(52) U.S. Cl.
CPC .............. *B01F 29/31* (2022.01); *B01F 29/34* (2022.01)

(58) Field of Classification Search
CPC ......... B01F 29/31; B01F 29/32; B01F 29/321
USPC ................................ 366/208, 213, 214, 233
See application file for complete search history.

(56) References Cited

U.S. PATENT DOCUMENTS 1,631,999 A * 6/1927 Chandler .................. C09F 7/00 206/524.5
2,006,451 A * 7/1935 Glidden ................ B01F 29/321 269/287
2,484,873 A * 10/1949 Brant .................... B02C 17/181 366/208
2,883,063 A 4/1959 Louis
3,163,404 A * 12/1964 Kraft ......................... B01L 1/00 366/214
3,338,795 A * 8/1967 McBee .................. C12M 23/50 366/208
3,625,485 A 12/1971 Adler
D248,407 S 7/1978 Bassett et al.
D259,141 S 5/1981 Oliver
4,892,412 A * 1/1990 Thomas ................ B01F 29/321 366/214
4,982,850 A 1/1991 Mears
(Continued)

FOREIGN PATENT DOCUMENTS

CN 114632448 A 6/2022
IN 371650-001 12/2023
IT 20100128 A1 5/2012

OTHER PUBLICATIONS

New 304 Round Test Tube Rack, Hole diameter 19123mm 9/12 holes Diameter 100mm. Online, published date unknown. Retrieved on Jan. 13, 2025 from URL: https://www.ebay.com/itm/315831994099.
(Continued)

*Primary Examiner* — David L Sorkin
(74) *Attorney, Agent, or Firm* — MICHAEL BEST & FRIEDRICH LLP

(57) ABSTRACT

A roller mixer system including a tube roller and a tube holder. The tube roller includes a motor and a plurality of rollers rotated by the motor. The tube holder includes a main shaft defining a shaft width and including a side, a first end defining a first width, a second end opposite the first end, and a clip disposed on the side and configured to receive a tube. The first width is greater than the shaft width. The second end defines a second width greater than the shaft width.

18 Claims, 18 Drawing Sheets

(56) References Cited

U.S. PATENT DOCUMENTS

| | | | | |
|---|---|---|---|---|
| 5,299,864 | A * | 4/1994 | Reynolds | B01F 29/31<br>366/233 |
| D364,929 | S | 12/1995 | Bigler et al. | |
| 5,894,944 | A | 4/1999 | Swift | |
| 6,500,666 | B1 * | 12/2002 | Clements-Macak | C12M 23/48<br>211/74 |
| 8,302,787 | B2 * | 11/2012 | Tobey | A61J 1/16<br>211/77 |
| D705,444 | S | 5/2014 | D'argy et al. | |
| D724,199 | S | 3/2015 | Bambot et al. | |
| D754,872 | S | 4/2016 | Li et al. | |
| D763,464 | S | 8/2016 | Li et al. | |
| D810,958 | S | 2/2018 | Lacy et al. | |
| D836,719 | S | 12/2018 | Smith et al. | |
| D867,589 | S | 11/2019 | Dai | |
| D898,941 | S | 10/2020 | Ollar | |
| D930,852 | S | 9/2021 | Rapier et al. | |
| D952,183 | S | 5/2022 | Kern | |
| D1,017,831 | S | 3/2024 | Goh | |
| 2012/0163117 | A1 * | 6/2012 | Guidry, Jr. | B01F 29/60<br>366/214 |
| 2017/0246600 | A1 * | 8/2017 | Jakobsen | B01F 29/321 |
| 2018/0029040 | A1 | 2/2018 | Driscoll et al. | |
| 2018/0340948 | A1 * | 11/2018 | Andlauer | G01N 35/00732 |
| 2019/0184347 | A1 | 6/2019 | Seaborn | |
| 2021/0260541 | A1 | 8/2021 | Erb et al. | |

OTHER PUBLICATIONS

Tube Roller Racks. Online, published date unknown. Retrieved on Jan. 13, 2025 from URL: https://www.heathrowscientific.com/ tube-roller-racks/.

* cited by examiner

TUBE HOLDER

FIELD OF INVENTION

Exemplary embodiments relate to the art of tube rollers, and more particularly, to tube holders rotated by tube rollers.

SUMMARY

In one aspect, the disclosure provides a roller mixer system including a tube roller and a tube holder. The tube roller includes a motor and a plurality of rollers rotated by the motor. The tube holder includes a main shaft defining a shaft width and including a side, a first end defining a first width, a second end opposite the first end and defining a second width, and a clip disposed on the side and configured to receive a tube. The first width is greater than the shaft width. The second width is greater than the shaft width.

In another aspect, the disclosure provides a tube holder configured to receive a tube. The tube holder includes a main shaft defining a shaft width and including a side, a first end defining a first width, a second end opposite the first end and defining a second width, and at least one clip disposed on the side. The first width is greater than the shaft width. The second width is greater than the shaft width. The at least one clip is configured to receive the tube.

In another aspect, the disclosure provides a tube holder configured to receive a plurality of tubes. The tube holder includes a main shaft defining a shaft width and including a side, a first end defining a first width, a second end opposite the first end and defining a second width, an intermediate portion disposed between the first end and the second end, a first clip disposed on the side between the first end and the intermediate portion, and a second clip disposed on the side between the second end and the intermediate portion. The first width is greater than the shaft width. The second width is greater than the shaft width. The intermediate portion defines an intermediate width. The intermediate width is greater than the shaft width. The first clip is configured to receive a first of the plurality of tubes. The second clip is configured to receive a second of the plurality of tubes.

Other aspects and embodiments will become apparent by consideration of the detailed description and accompanying drawings.

DETAILED DESCRIPTION

Before any embodiments are explained in detail, it is to be understood that the disclosure is not intended to be limited in its application to the details of construction and the arrangement of components set forth in the following description or illustrated in the following drawings. Embodiments are capable of other configurations and of being practiced or of being carried out in various ways.

Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items.

Figure 1:
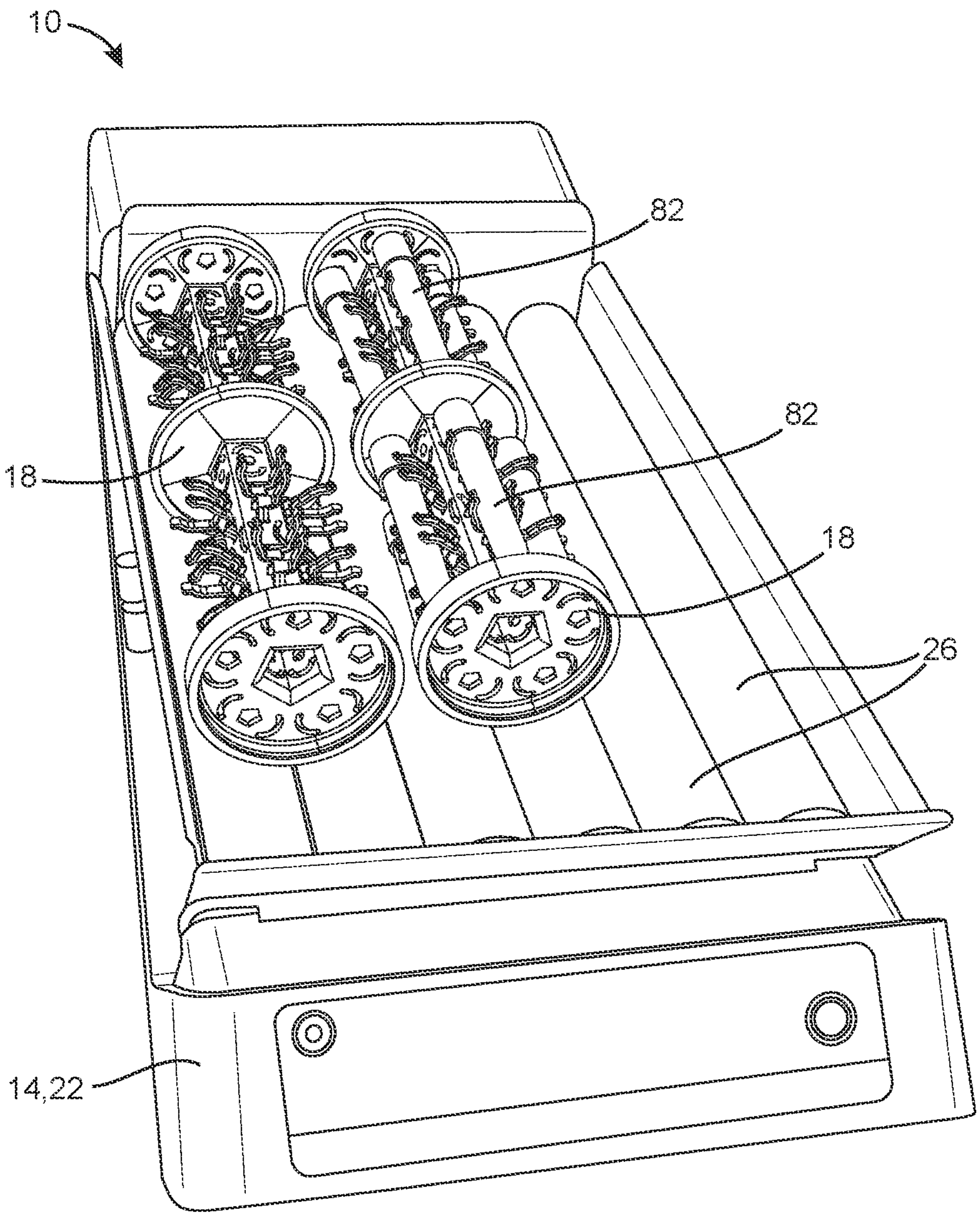
FIG. 1 is a perspective view of a tube roller and tube holders.

Referring now to the figures, FIG. 1 depicts an embodiment of roller mixer system 10. The roller mixer system 10 includes a tube roller 14 and a tube holder 18. The tube roller 14 includes a housing 22, a motor (not shown) within the housing 22, and a plurality of rollers 26. The illustrated tube roller 14 includes six rollers 26. In some embodiments, there may be fewer or more rollers 26. Each of the rollers 26 is operatively connected to the motor. The motor rotates the rollers 26 about a roller axis (not shown). In some embodiments, the rollers 26 are rotated in the same direction. The rollers 26 may also be actuated in a linear or curved manner relative to the housing 22. Said another way, the rollers 26 may both be rotated about the roller axes and actuated relative to the housing 22 in a curved trajectory (e.g., clockwise ellipse). The illustrated roller mixer system 10 includes two tube holder 18. In other embodiments, there may be fewer or more tube holders 18.

Figure 2:
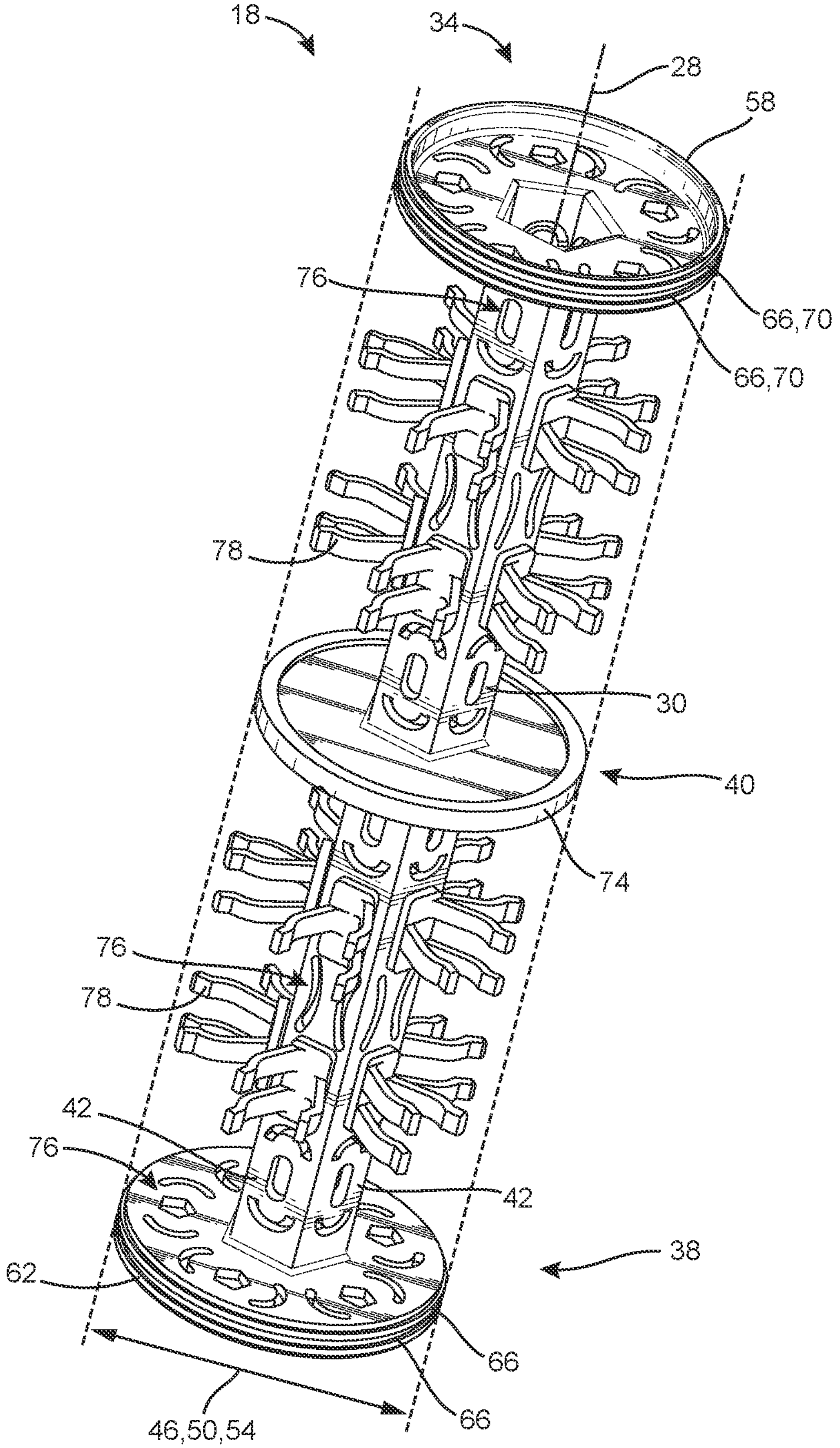
FIG. 2 is a perspective view of the tube holder of FIG. 1.
Figure 3:
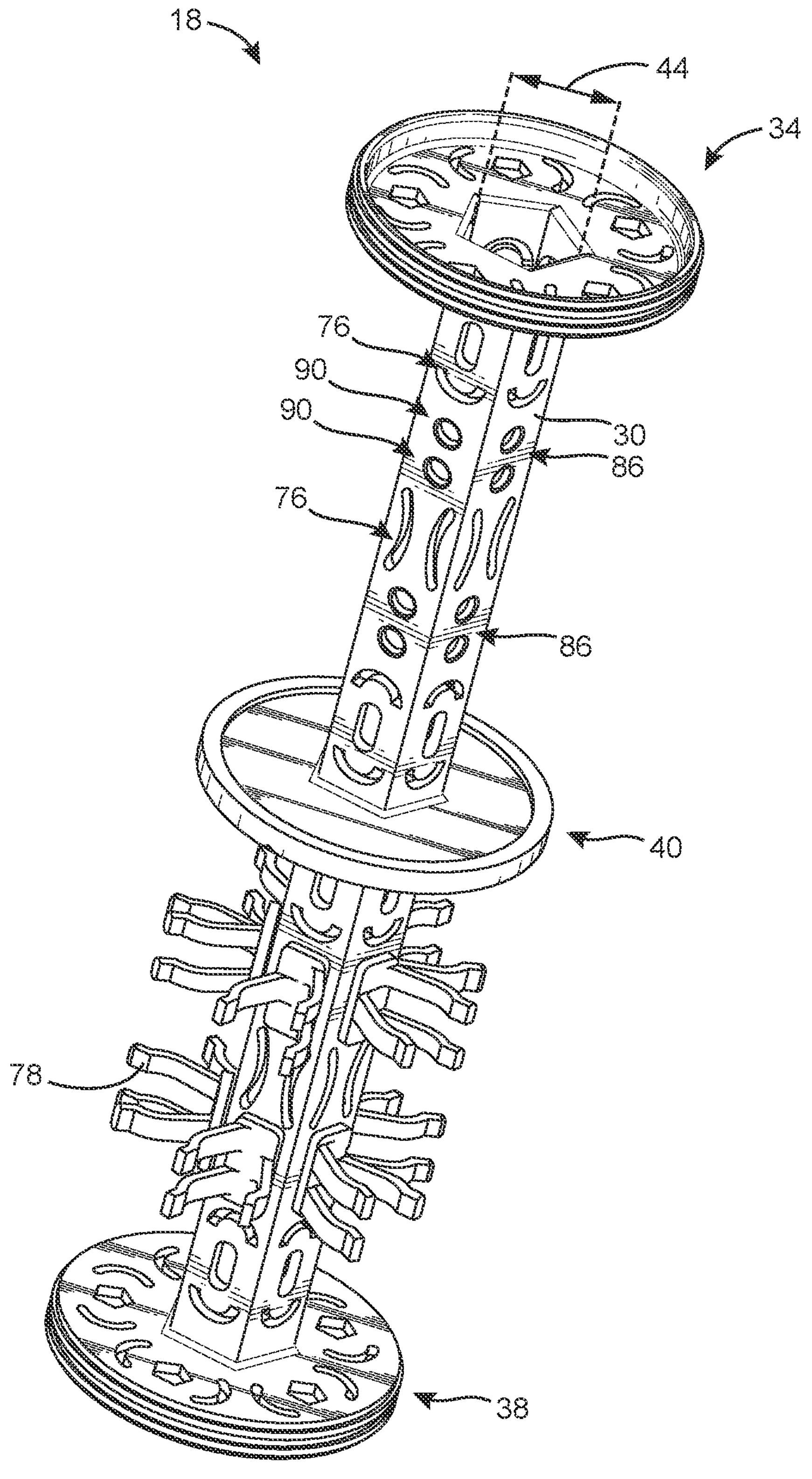
FIG. 3 is a perspective view of the tube holder of FIG. 1 with a portion of the clips removed.

As best illustrated in FIG. 2, the tube holder 18 defines a longitudinal axis 28 and includes a main shaft 30 extending between a first end 34 and a second end 38, and an intermediate portion 40 located between the first and second ends 34, 38. The main shaft 30 includes a plurality of sides 42 and defines a shaft width 44 (FIG. 3). The illustrated tube holder 18 has five sides 42. In some embodiments, the main shaft 30 may include fewer or more sides 42. The first end 34 extends radially outward from the longitudinal axis 28 and defines a first width 46, the second end 38 extends radially outward from the longitudinal axis 28 and defines a second width 50, and the intermediate portion 40 extends radially outward from the longitudinal axis 28 and defines an intermediate width 54. The illustrated first end 34, second end 38, and intermediate portion 40 are circular or disc-shaped. In some embodiments, the first end 34, second end 38, and intermediate portion 40 may have a different shape. The illustrated first end 34, second end 38, and intermediate portion 40 are integral with the main shaft 30. In some embodiments, the first end 34, second end 38, and intermediate portion 40 may be coupled to the main shaft 30. The illustrated first, second, and intermediate widths 46, 50, 54 are identical. In some embodiments, first, second, and intermediate widths 46, 50, 54 are different. The illustrated first, second, and intermediate widths 46, 50, 54 are each greater than the shaft width 44. In some embodiments, the first, second, intermediate widths 46, 50, 54, or any combination thereof, may be equal to the shaft width 44.

With continued reference to FIG. 2, the first end 34 includes a first flange 58 and the second end 38 includes a second flange 62. The first and second flanges 58, 62 each extend away from the intermediate portion 40 in a direction parallel with the longitudinal axis 28. The first and second flanges 58, 62 include grooves 66, each of which are configured to receive at least one end gasket 70 (e.g., O-rings). The illustrated first and second flanges 58, 62 each include two grooves 66 and two end gaskets 70. In some embodiments, the first and second flanges 58, 62 may include fewer or more grooves 66 and end gaskets 70. The illustrated grooves 66 in the first flange 58 each include one of the gaskets 70, and the illustrated grooves 66 in the second flange 62 do not include gaskets 70. In some embodiments, the first and second ends 34, 38 may not include flanges. The intermediate portion 40 also includes an intermediate gasket 74. The illustrated intermediate gasket 74 covers a perimeter surface (not shown) of the intermediate portion 40. In some embodiments, the intermediate portion 40 may include one or more grooves, which are each configured to receive gaskets similar to the end gaskets 70, or may not include any gasket. In some embodiments, the end gaskets 70 may envelop or surround a perimeter surface of first and second flanges 58, 62, similar to how the intermediate gasket 74 envelops the perimeter surface of the intermediate portion 40.

With continued reference to FIG. 2, the tube holder 18 includes a plurality of apertures 76. The illustrated apertures 76 have different shapes. In some embodiments, the apertures 76 may have the same shape. The illustrated apertures 76 are located on the main shaft 30, the first end 34, and the second end 38. In some embodiments, the apertures 76 may also be located on the intermediate portion 40. In other embodiments, the apertures 76 may be located on fewer portions (i.e., the main shaft 30, the first end 34, the second end 38, and the intermediate portion 40) of the tube holder 18. The apertures 76 reduce the amount of material needed for the tube holder 18.

With continued reference to FIG. 2, the tube holder 18 includes a plurality of clips 78, which are configured to receive tubes 82 (FIG. 1). The clips 78 are located on each of the sides 42. The illustrated tube holder 18 includes four clips 78 on each side 42, with two clips 78 located between the first end 34 and the intermediate portion 40 and two clips 78 located between the second end 38 and the intermediate portion 40. In some embodiments, there may be fewer or more clips 78 on each of the sides 42.

Figure 4:
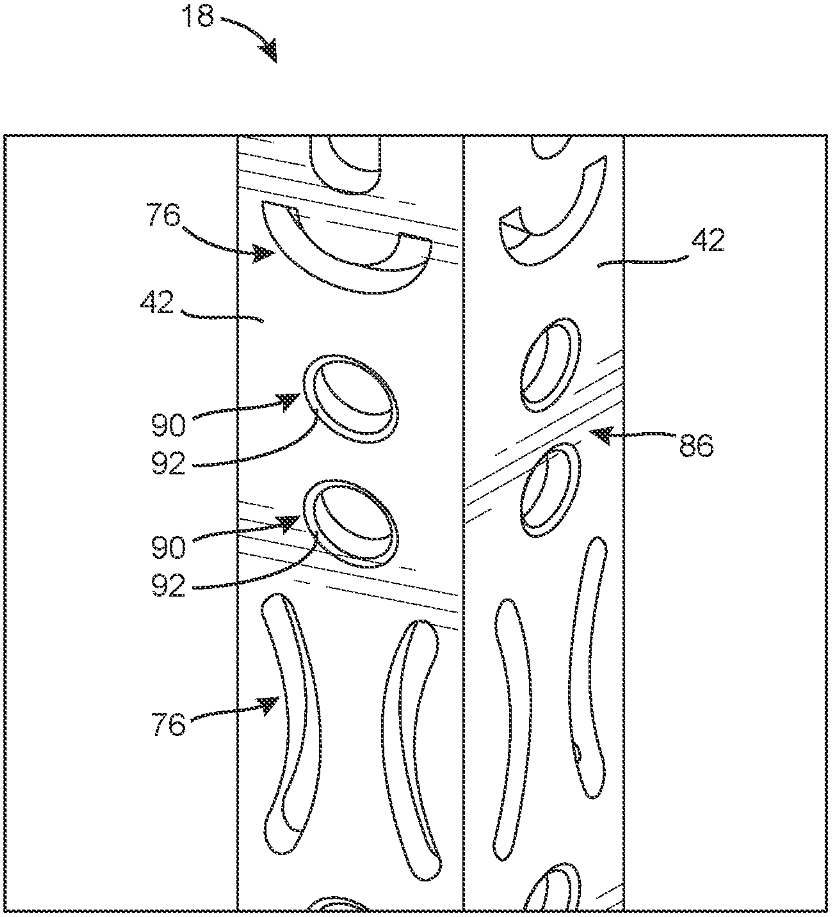
FIG. 4 is an enlarged view of mounts of the tube holder of FIG. 1.

As illustrated in FIGS. 3 and 4, the main shaft 30 includes mounts 86 located on each side 42, which are configured to receive the clips 78. The mounts 86 include mounting apertures 90. The mounting apertures 90 include a bevel 92 on an external side of the main shaft 30. The illustrated mounts 86 include two mounting apertures 90. In some embodiments, the mounts 86 may include fewer or more mounting apertures 90. The mounting apertures 90 are circular. In some embodiments, the mounting apertures 90 may have a different shape (e.g., triangular, rectangular, etc.). The illustrated mounting apertures 90 are aligned with each other in a direction parallel with the longitudinal axis 28. In some embodiments, the mounting apertures 90 may be misaligned with each other or aligned in a different direction.

Figure 5:
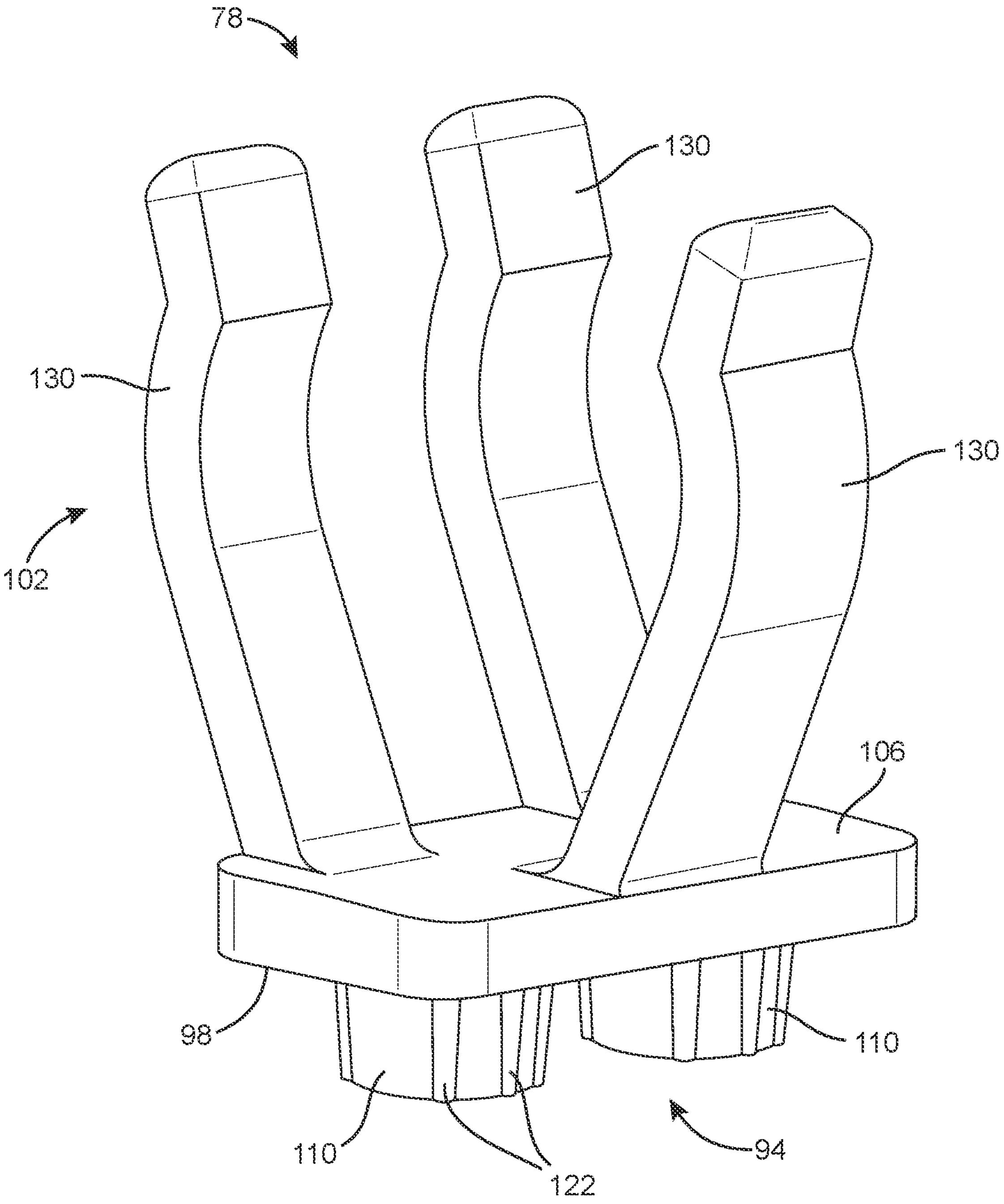
FIG. 5 is a perspective view of one of the clips of FIG. 1.
Figure 6:
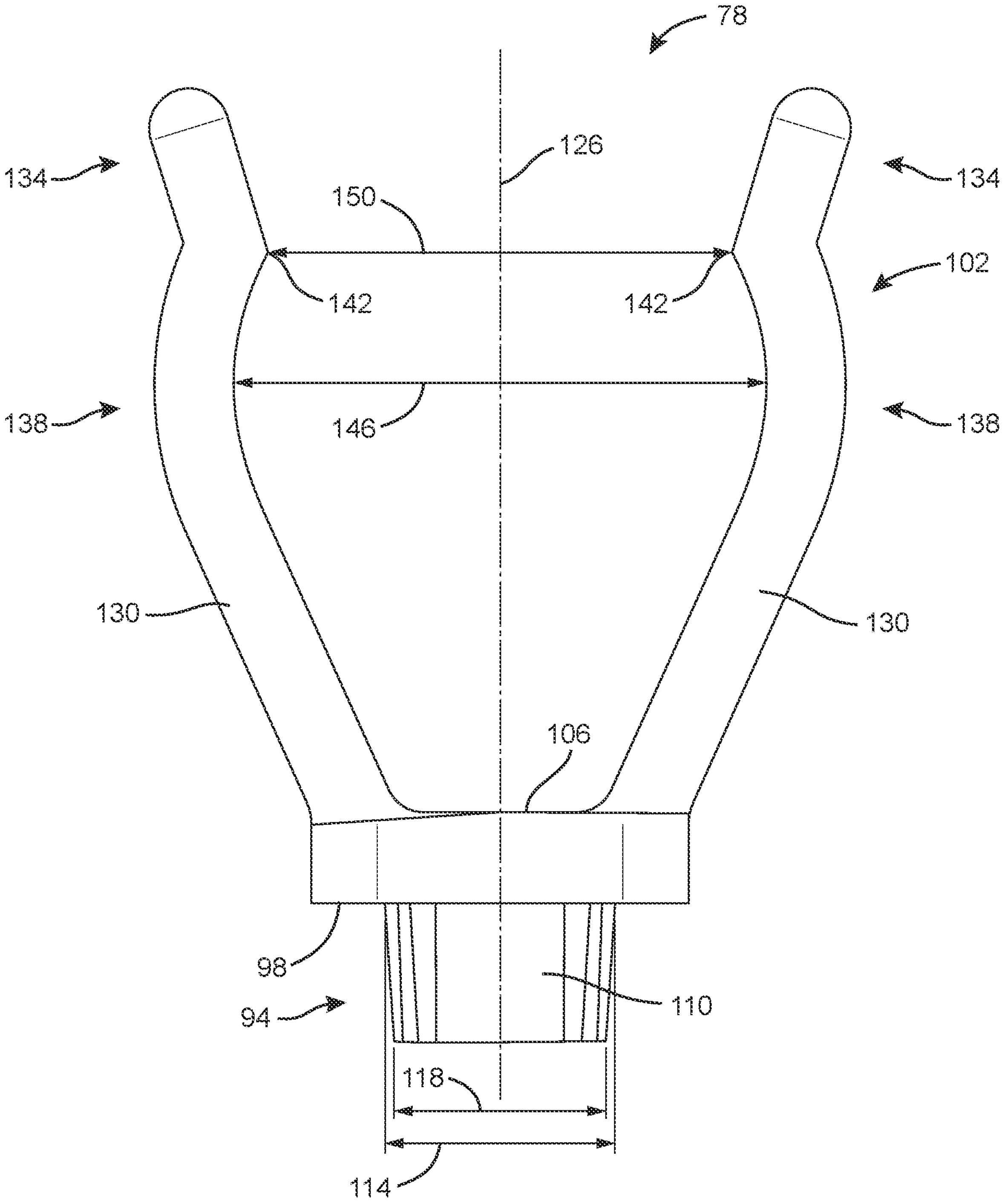
FIG. 6 is a side view of the clip of FIG. 5.
Figure 7:
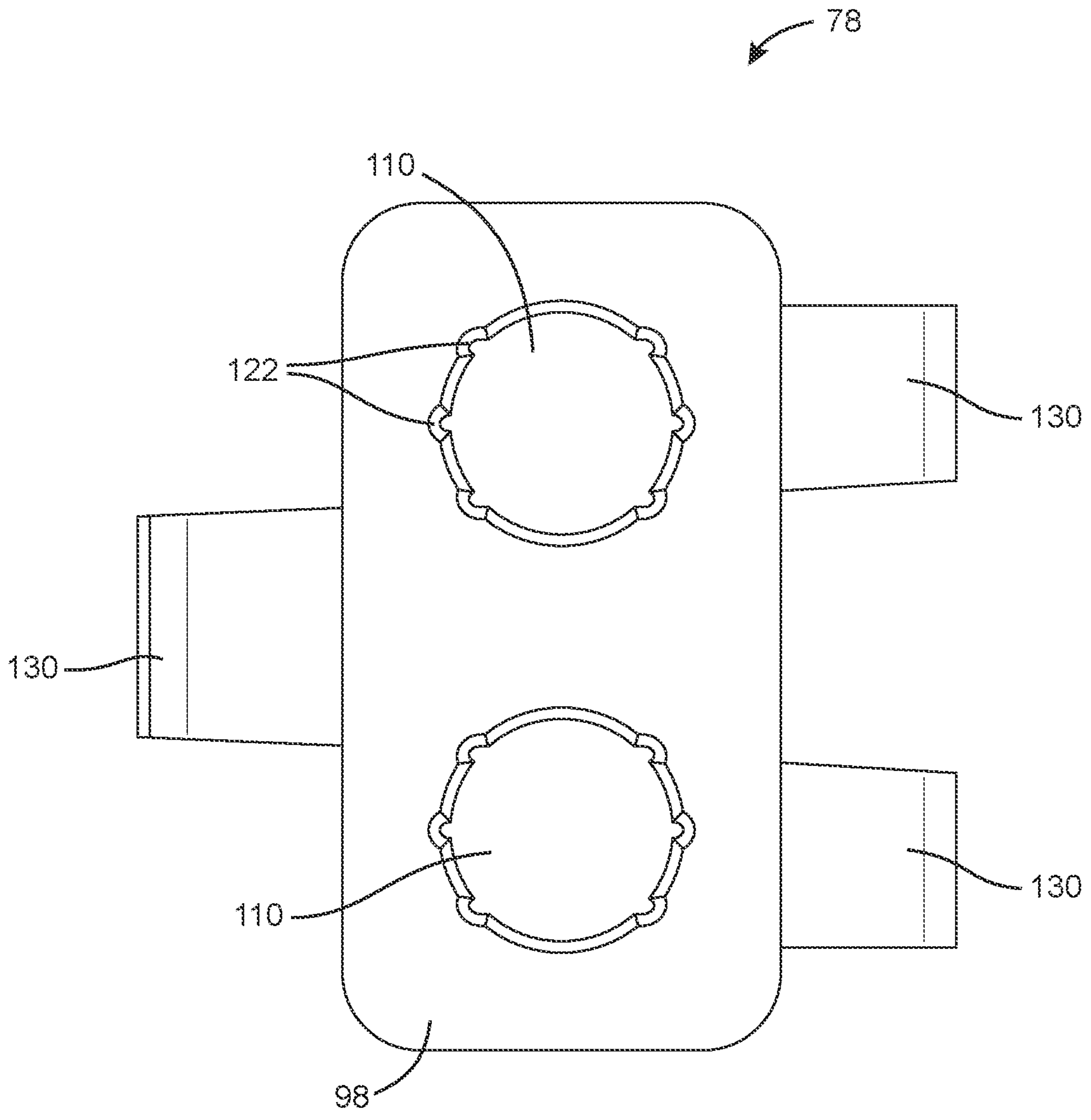
FIG. 7 is a bottom view of the clip of FIG. 5.

With reference to FIGS. 5-7, the clips 78 include a mounting portion 94 on a first side 98 and a receiving portion 102 on a second side 106 opposite the first side 98. The mounting portion 94 includes at least one protrusion 110. The illustrated mounting portion 94 includes two protrusions 110. The protrusions 110 are conical, such that the protrusions 110 define a first diameter 114 on a portion of the protrusions 110 closest to the first side 98 and a second diameter 118 smaller than the first diameter 114 on a portion of the protrusions 110 furthest from the first side 98. In other embodiments, the protrusions 110 may be differently shaped, such that the first and second diameters 114, 118 may instead be referred to as third and fourth widths, respectively. The protrusions 110 include ridges 122, which extend in a direction parallel with a longitudinal plane 126 defined by the clips 78. The illustrated ridges 122 extend along the entire length of the protrusions 110. The ridges 122 have a greater width closest to the first side 98 and a smaller width furthest from the first side 98. The illustrated protrusions 110 include six ridges 122, with three ridges 122 on each side of the longitudinal plane 126. In other embodiments, the protrusions 110 may have fewer or more ridges 122.

With continued reference to FIGS. 5-7, the receiving portion 102 includes a plurality of claws 130. The illustrated receiving portion 102 includes three claws 130, with two claws 130 on a first side of the longitudinal plane 126 and one claw 130 on a second side of the longitudinal plane 126. In other embodiments, there may be fewer or more claws 130 in any arrangement. The claws 130 each include an end portion 134, a curved portion 138, and an intersection point 142 between the end and curved portions 134, 138. The curved portions 138 define a maximum distance 146, which is measured at an angle perpendicular to the longitudinal plane 126. The intersection points 142 define an intersection distance 150, which is measured at an angle perpendicular to the longitudinal plane 126. The maximum distance 146 is greater than the intersection distance 150. The clips 78 may be made of a partially elastic material that allows the claws 130 to flex in order to receive the tubes 82.

Figure 9:
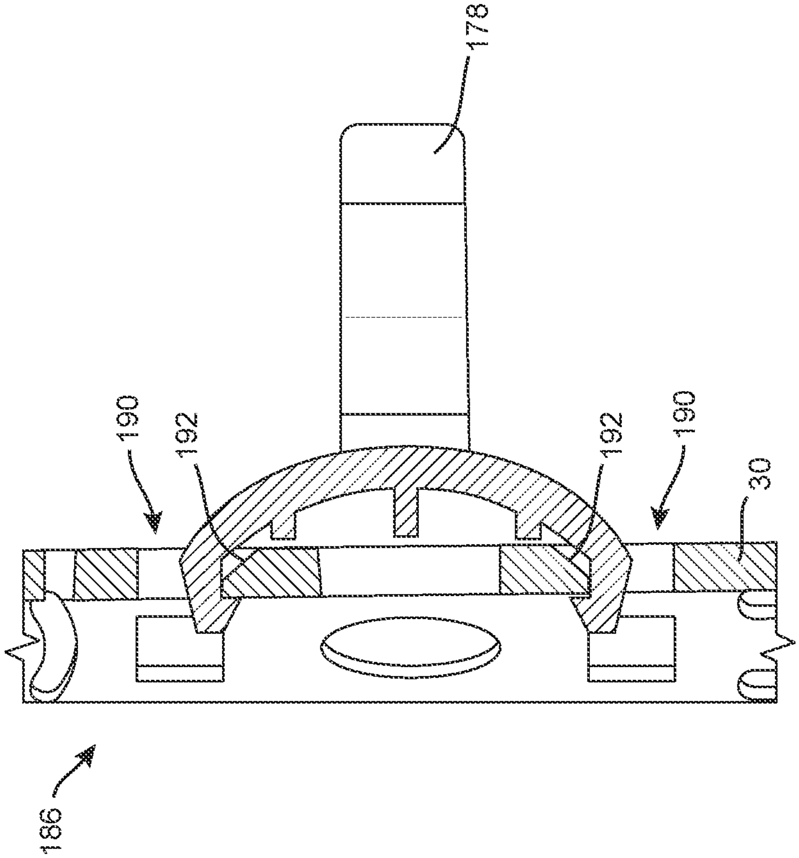
FIG. 9 is a cross-section view of one of the mounts of FIG. 8 and a clip.
Figure 8:
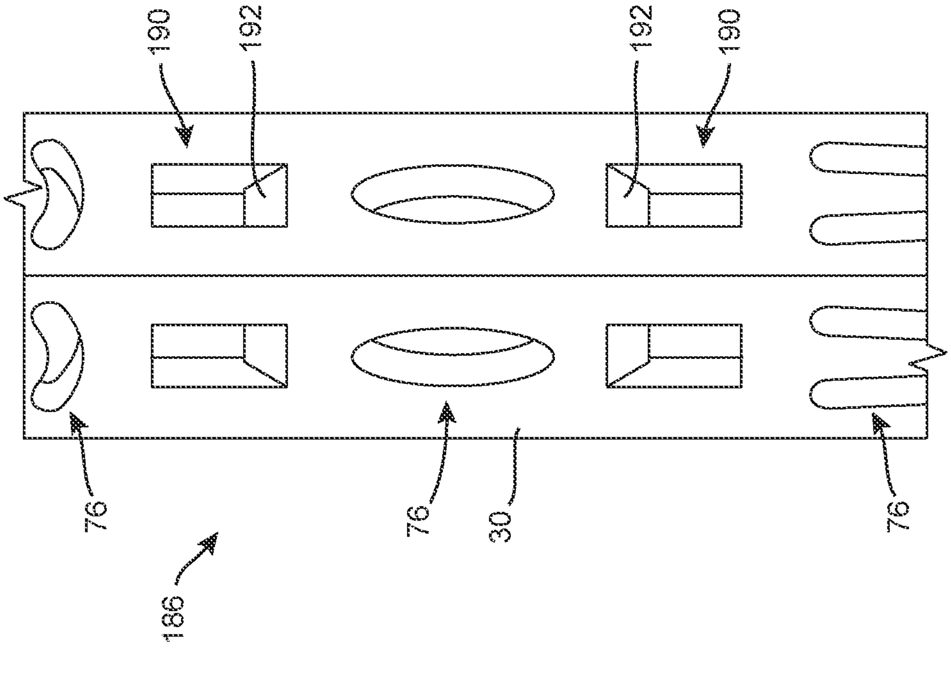
FIG. 8 is an enlarged view of another embodiment of mounts of the tube holder of FIG. 1.
Figure 10:
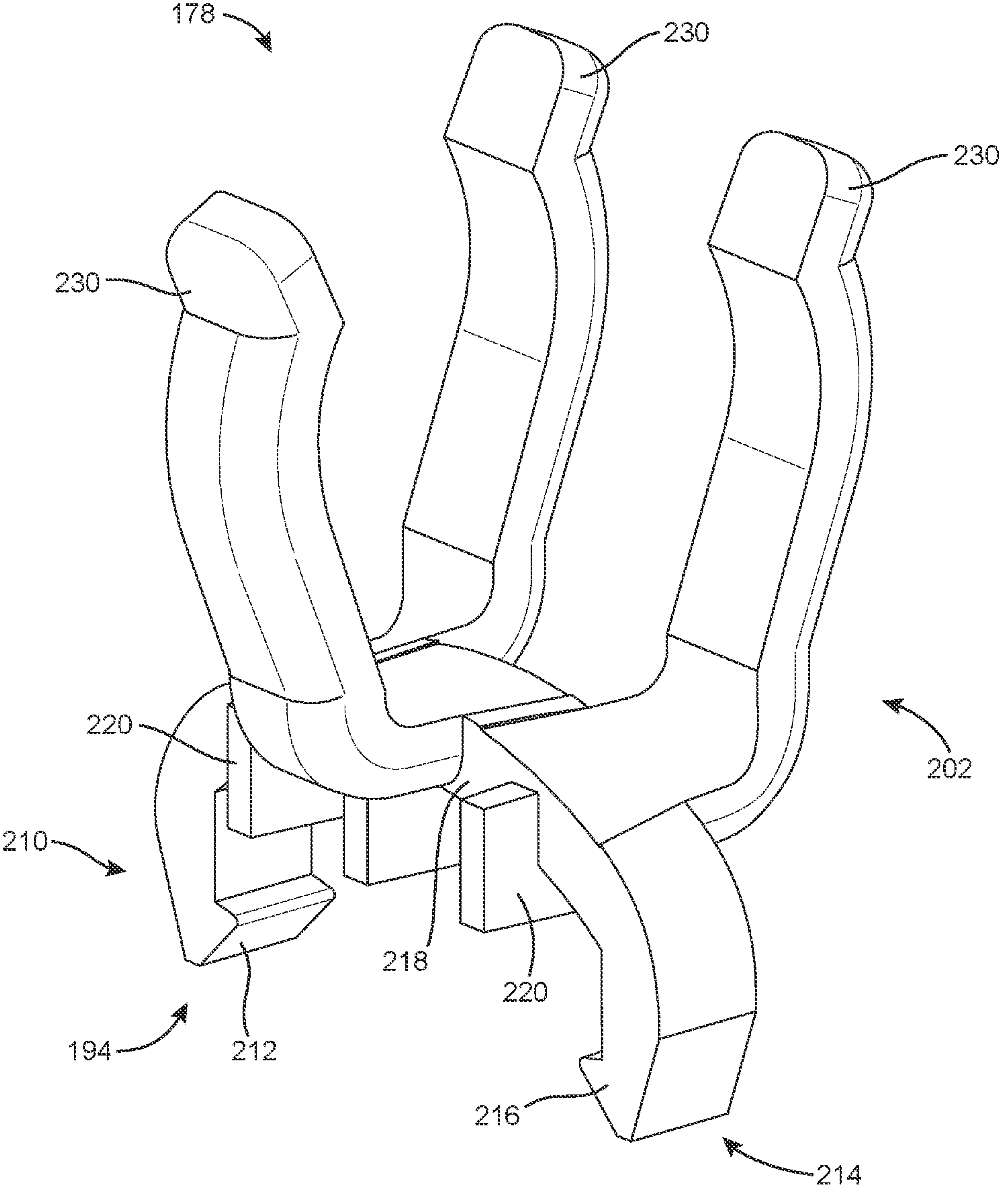
FIG. 10 is a perspective view of the clip of FIG. 9.
Figure 11:
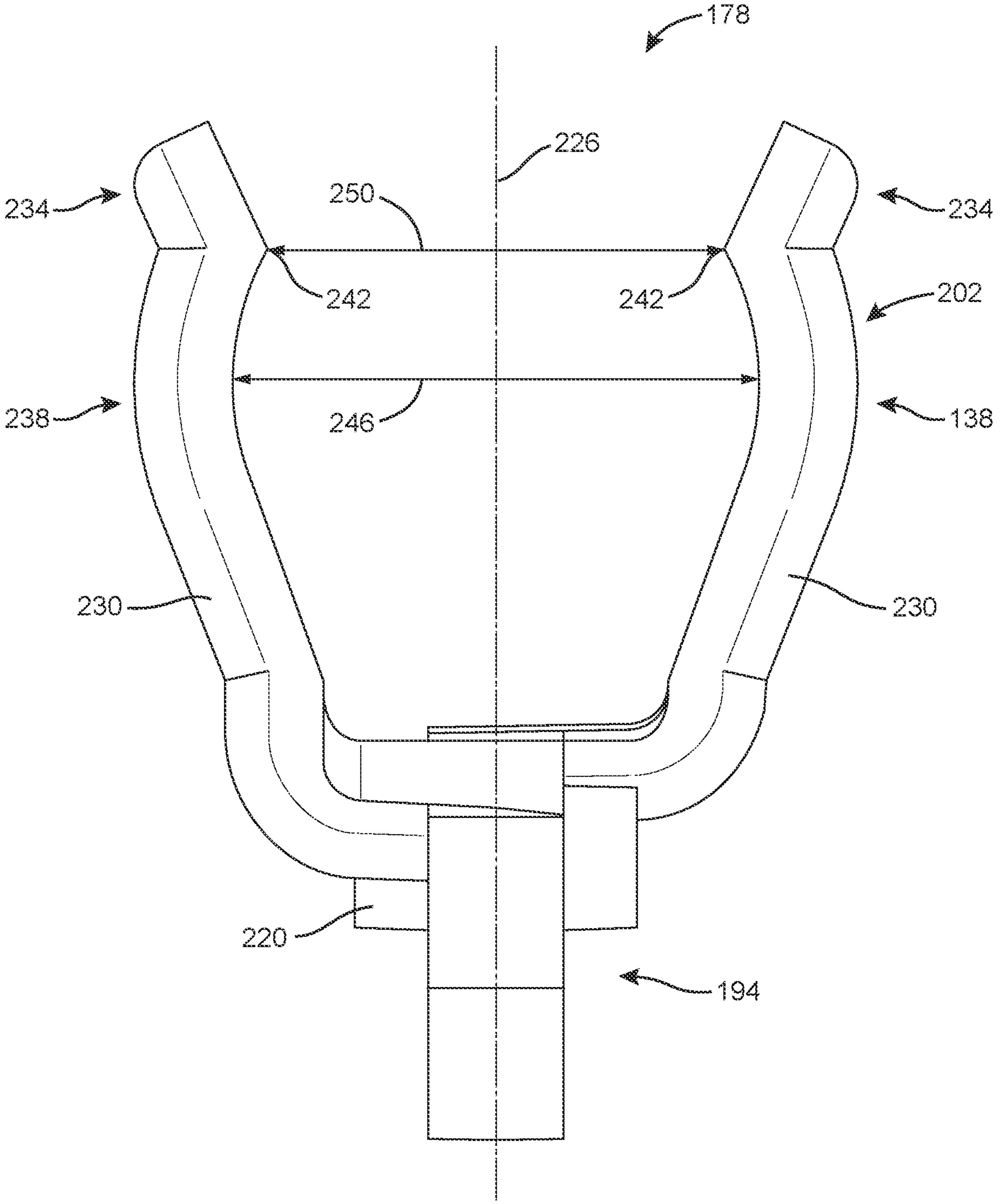
FIG. 11 is a first side view of the clip of FIG. 9, and is also identical to a mirrored third side view of the clip of FIG. 9.
Figure 12:
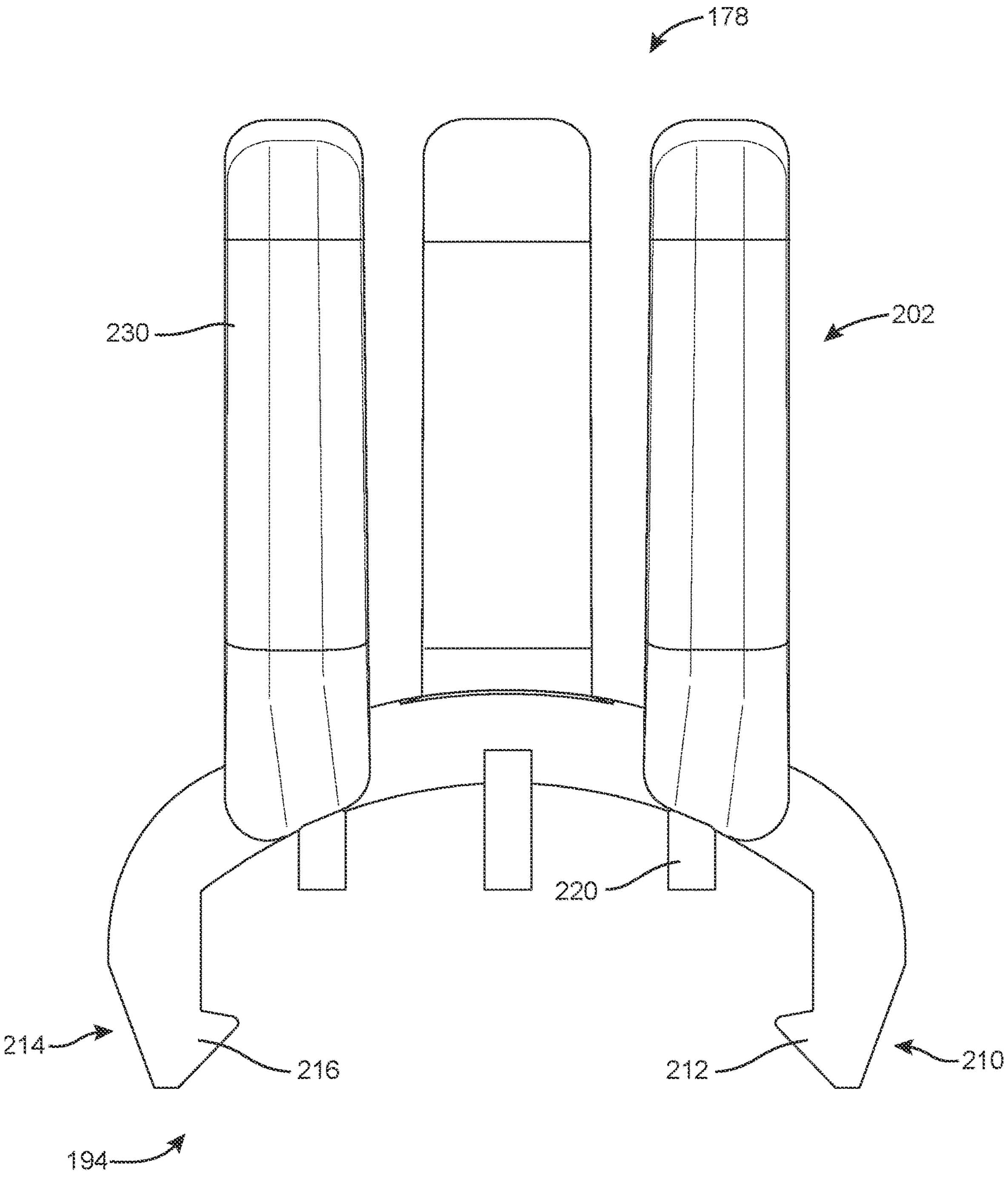
FIG. 12 is a second side view of the clip of FIG. 9.
Figure 13:
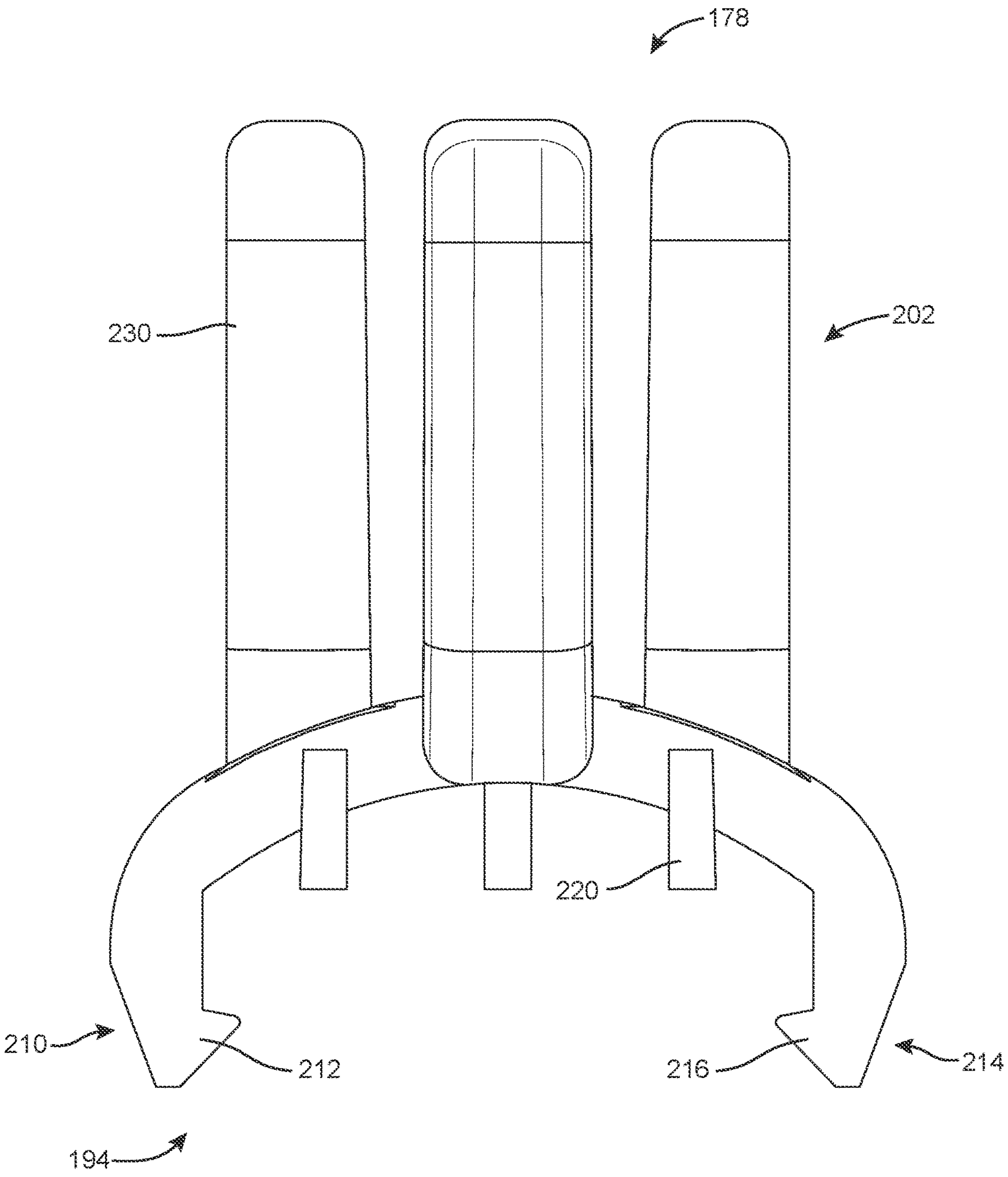
FIG. 13 is a fourth side view of the clip of FIG. 9.
Figure 14:
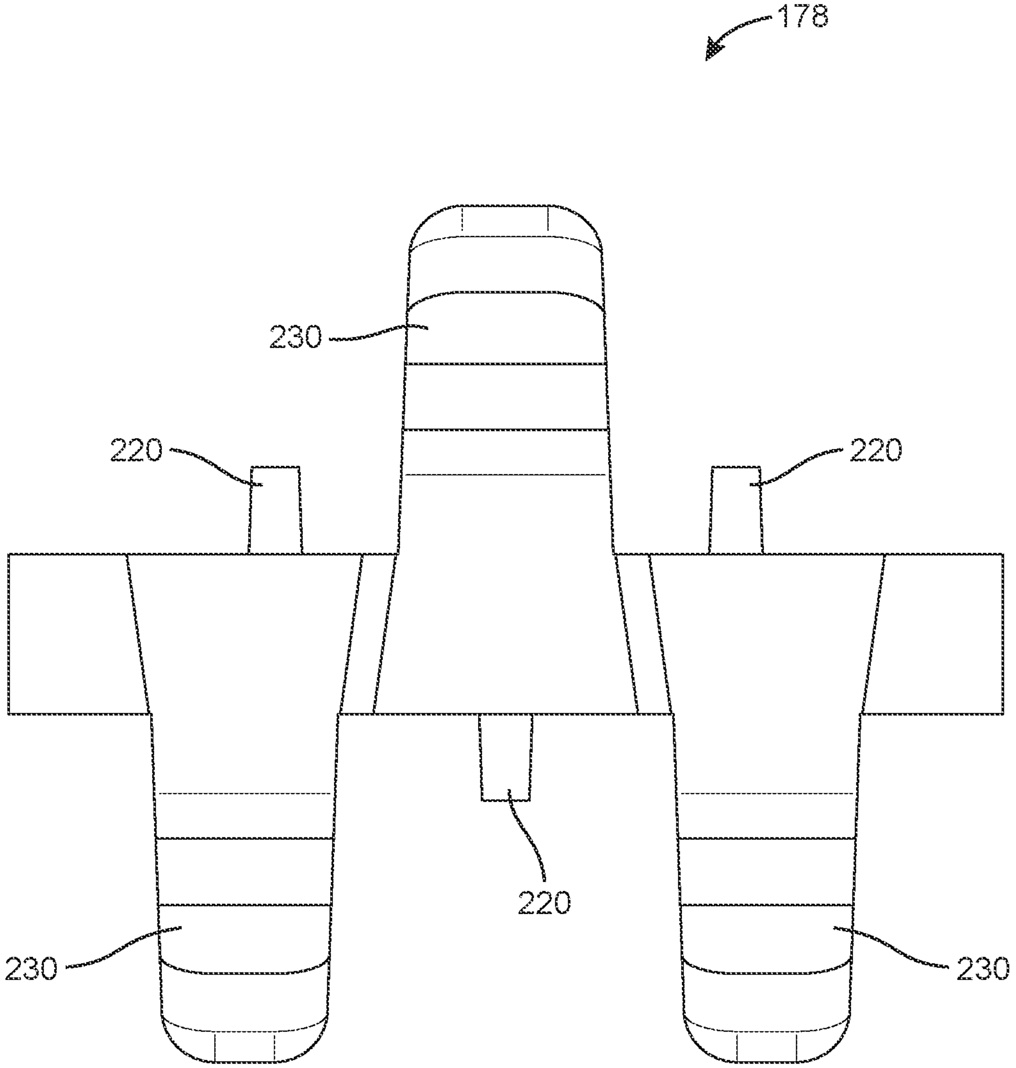
FIG. 14 is a top view of the clip of FIG. 9.
Figure 15:
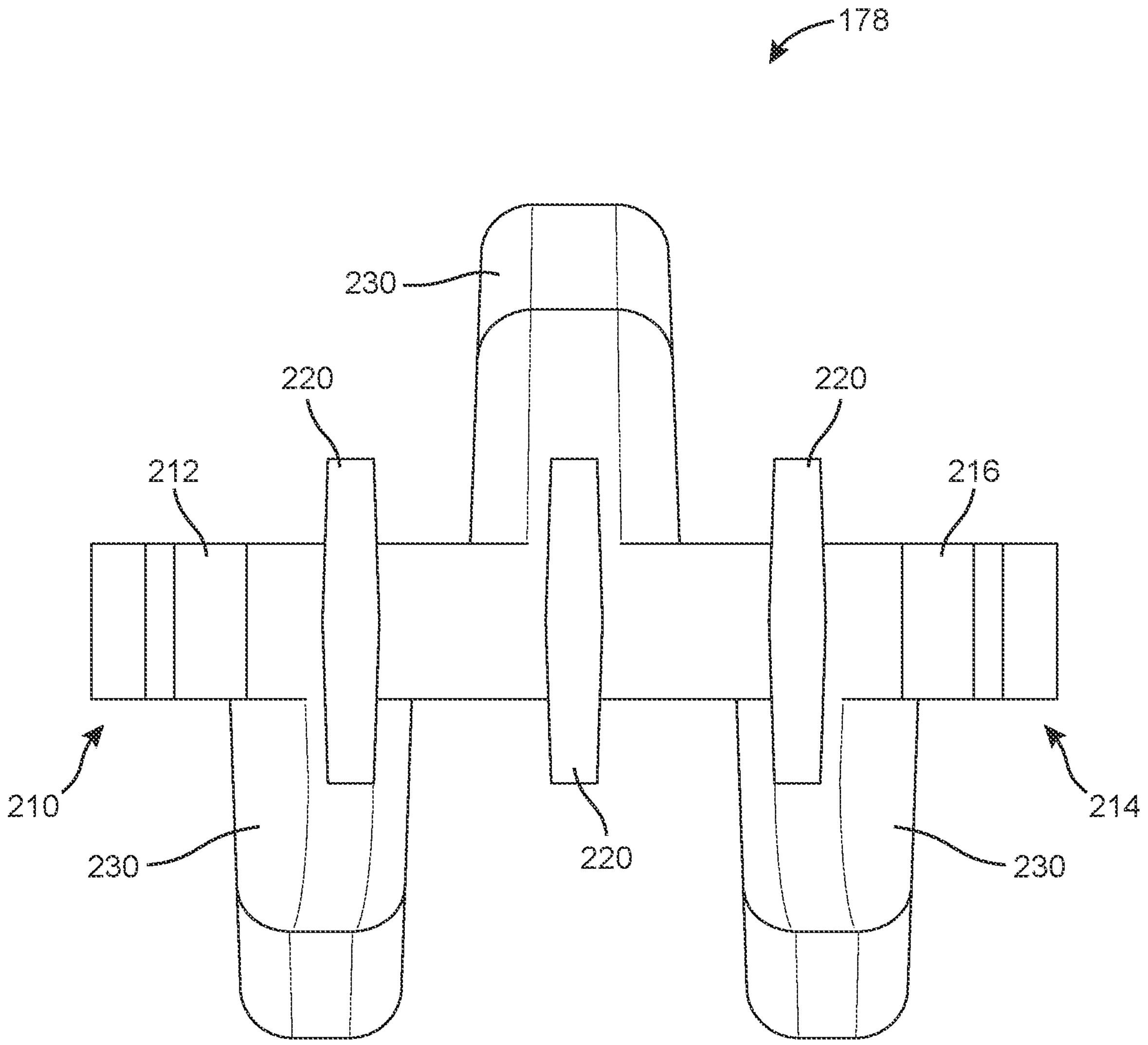
FIG. 15 is a bottom view of the clip of FIG. 9.

FIGS. 8 and 9 illustrate mounts 186 that may be used on the main shaft 30 of the tube holder 18 in place of the mounts 86. Each mount 186 is configured to receive a clip 178. The mounts 186 include mounting apertures 190. Each mounting aperture 190 includes a bevel 192 on an external side of the main shaft 30. The bevel 192 is on a side of each mounting aperture 190 nearest the adjacent mounting aperture 190 on the same side 42 of the tube holder 18. In some embodiments, the bevel 192 is on a side of each mounting aperture 190 furthest from the adjacent mounting aperture 190. The illustrated mounts 186 include two mounting apertures 190. In some embodiments, the mounts 186 may include fewer or more mounting apertures 190. The illustrated mounting apertures 190 include one of the apertures 76 therebetween. In some embodiments, there may be zero or more apertures 76 between adjacent mounting apertures 190. The illustrated mounting apertures 190 are rectangular. In some embodiments, the mounting apertures 190 may have a different shape (e.g., triangular, circular, etc.). The illustrated mounting apertures 190 are aligned with each other in a direction parallel with the longitudinal axis 28. In some embodiments, the mounting apertures 190 may be misaligned with each other or aligned in a different direction.

With reference to FIGS. 10-15, each clip 178 includes a mounting portion 194 and a receiving portion 202 opposite the mounting portion 194. The mounting portion 194 has a generally arcuate shape and includes a first end 210 having a first prong 212, a second end 214 having a second prong 216, and a body 218 therebetween. The prongs 212, 216 extend from the mounting portion 194 toward each other. The prongs 212, 216 are configured to be received in the respective mounting apertures 190 to couple the clip 178 to the main shaft 30. The mounting portion 194 further includes abutment portions 220. The abutment portions 220 project off the body 218 in a direction away from the receiving portion 202. The abutment portions 220 extend along a length direction that intersects a longitudinal plane 226 of the clip 178. The illustrated abutment portions 220 are not in contact with the main shaft 30 (FIG. 9).

In further embodiments, the clips 178 may be composed of a partially elastic material. As such, the clips 178 may be configured to flex under stress, which causes the abutment portions 220 to contact the main shaft 30. In some embodiments, the abutment portions 220 may be in contact with the main shaft 30 when the clip 178 is not flexed. The illustrated mounting portion 194 includes three abutment portions 220. In other embodiments, the mounting portion 194 may include fewer or more abutment portions 220. The partially elastic material of the clips 178 further allows the mounting portion 194 to flex to be coupled to the tube holder 18. The illustrated clip 178 is configured to flex as the prongs 212, 216 come into contact with the respective bevels 192. As such, the mounting portion 194 may be configured to snap on to the respective mount 186.

With continued reference to FIGS. 10-15, the receiving portion 202 includes a plurality of claws 230. The illustrated receiving portion 202 includes three claws 230, with two claws 230 on a first side of the longitudinal plane 226 and one claw 230 on a second side of the longitudinal plane 226. In other embodiments, there may be fewer or more claws 230 in any arrangement. The claws 230 each include an end portion 234, a curved portion 238, and an intersection point 242 between the end and curved portions 234, 238. The curved portions 238 define a maximum distance 246, which is measured at an angle perpendicular to the longitudinal plane 226. The intersection points 242 define an intersection distance 250, which is measured at an angle perpendicular to the longitudinal plane 226. The maximum distance 246 is greater than the intersection distance 250. The receiving portion 202 is similar to the receiving portion 102. In some embodiments, the receiving portion 202 may be the same as the receiving portion 102. The partially elastic material of the clips 178 may allow the claws 230 to flex in order to receive the tubes 82.

In some embodiments, a planar sheet may be processed (e.g., bent, folded, etc.) and coupled together (e.g., by clips, glue, etc.) to form the main shaft 30. The first end 34, the second end 38, the intermediate portion 40, the clips 78, 178, or any combination thereof, may be formed in independent processes (e.g., injection molding) and then coupled to the main shaft 30. In other embodiments, the main shaft 30 may be formed by an injection molding process. The first end 34, the second end 38, the intermediate portion 40, the clips 78, 178, or any combination thereof, may be integrally formed with the main shaft 30 or coupled to the main shaft 30.

In some embodiments, the tube holder 18 is assembled by first processing (e.g., bending, folding, etc.) a planar sheet into the general shape (e.g., pentagonal, rectangular, etc.) of the main shaft 30. The planar sheet is then coupled together (e.g., by clips, glue, etc.) to form the main shaft 30. The first end 34, the second end 38, the intermediate portion 40 (if included in the tube holder 18), and the clips 78, 178 are formed by respective processes (e.g., injection molding). The first end 34, the second end 38, and the intermediate portion 40 are respectively coupled (e.g., by clips, glue, etc.) to the main shaft 30. In embodiments with the clips 78 and the mounts 86, the clips 78 are coupled to the tube holder 18 by inserting the protrusions 110 into the respective mounting apertures 90. The ridges 122 press against an inner surface of the mounting apertures 90 to removably couple the clips 78 to the respective mounts 86. In embodiments with the clips 178 and the mounts 186, the clips 178 are coupled to the tube holder 18 by inserting the first and second ends 210, 214 into the respective mounting apertures 190. As the clips 178 are inserted into the mounting apertures 190, the first and second prongs 212, 216 contact and slide along the respective bevels 192. The prongs 212, 216 are flexed in a direction away from each other as the prongs 212, 216 slide along the respective bevels 192. The prongs 212, 216 then quickly flex back to their original shape once the prongs 212, 216 extend past the bevels 192. The prongs 212, 216 contact an inner surface of the tube holder 18 and secure the clip 178. The abutment portions 220 may also abut an outer surface of the tube holder 18. Once installed, any one of the clips 78, 178 may be removed from one of the mounts 86, 186 and then reinserted in another of the mounts 86, 186. The end gaskets 70 are then inserted into the respective grooves 66, and the intermediate gasket 74 is placed around the intermediate portion 40. Then, the tubes 82 are received by the claws 130, 230. The tubes 82 have a diameter substantially similar to the maximum distance 146, 246, such that as the tubes 82 are inserted into the claws 130, 230 toward the mounting portion 102, 202, the claws 130, 230 flex in a direction away from the longitudinal plane 126, 226. The claws 130, 230 will be at a maximum flexion point when the tubes 82 are aligned with the intersection points 142, 242. Once the tubes 82 pass the intersection points 142, 242, the claws 130, 230 will return to their original position and clamp the tubes 82 in place. The tube holder 18 may then be placed on the tube roller 14.

During operation, the tube holder 18 is contacted by two rollers 26. As the rollers 26 rotate, the tube holder 18 rotates. The angular speed of the tube holder 18 directly relates to the angular speed of the rollers 26. As such, increasing the angular speed of the rollers 26 will increase the angular speed of the tube holder 18. As the tube holder 18 rotates, material (e.g., liquids, bodily fluids, chemicals, etc.) within the tubes 82 is mixed.

Figure 16:
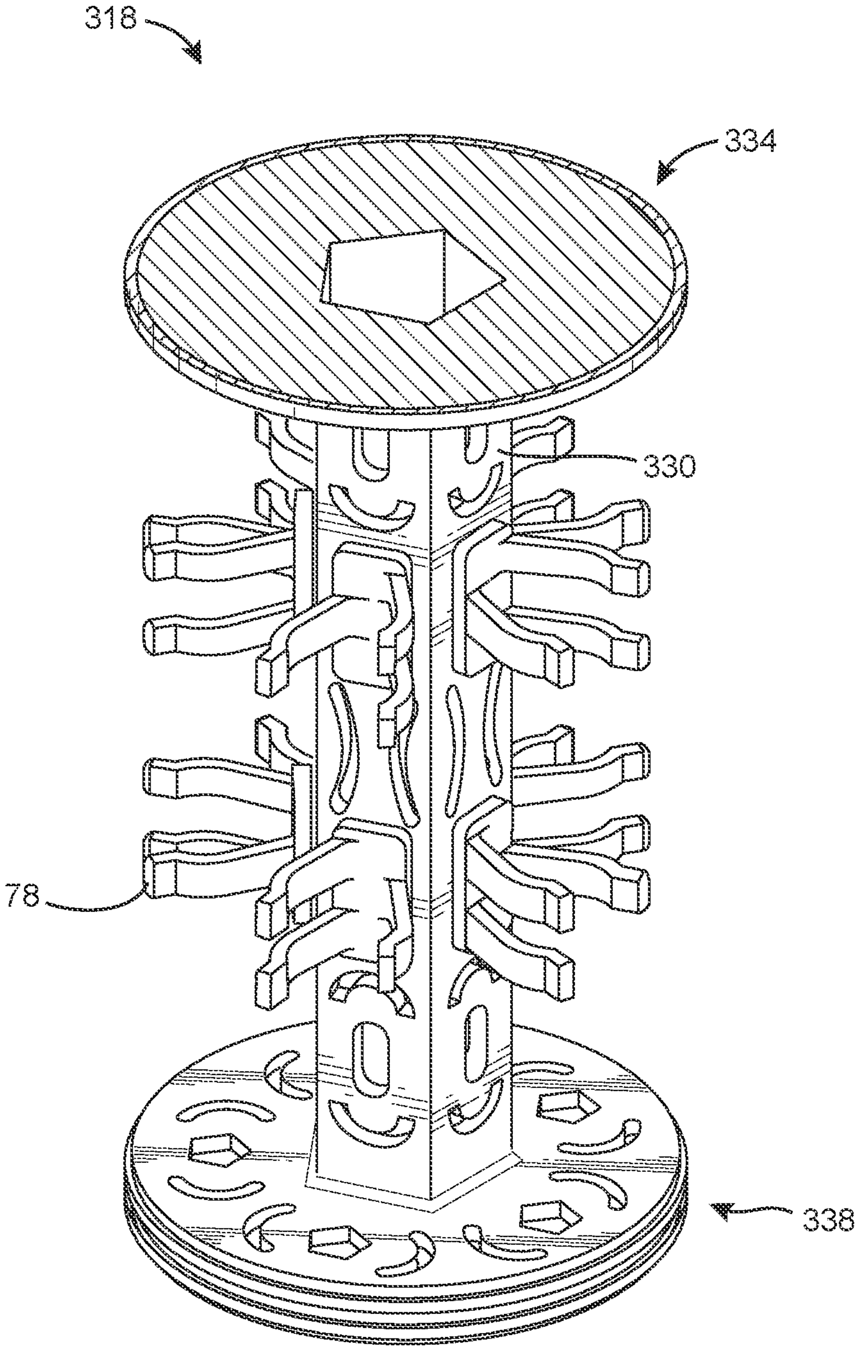
FIG. 16 is perspective view of a tube holder according to another embodiment.

FIG. 16 illustrates a tube holder 318 including a main shaft 330 between a first end 334 and a second end 338. The main shaft 330 includes similar features as the main shaft 30. The main shaft 330 includes the mounts 86 (not shown), which are configured to receive the clips 78. In some embodiments, the main shaft 330 may include the mounts 186, which are configured to receive the clips 178. The tube holder 318 is modular, such that the tube holder 318 may be coupled to additional tube holders. The illustrated first end 334 has similar features as the intermediate portion 40 of the tube holder 18, and the second end 338 has similar features as the second end 38 of the tube holder 18. In some embodiments, the first end 334 may have similar features as the first end 34 of the tube holder 18.

Figure 17:
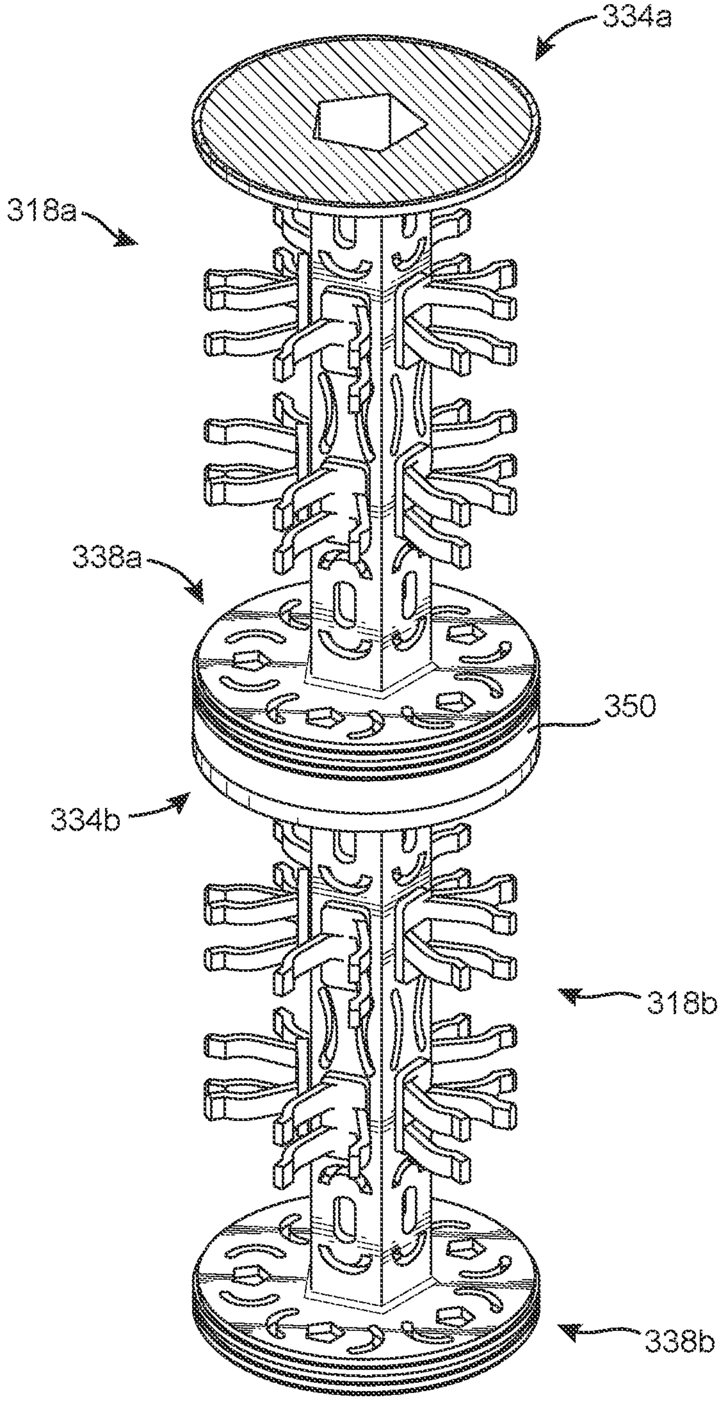
FIG. 17 is a perspective view of a first tube holder similar to the tube holder of FIG. 16 coupled to a second tube holder similar to the tube holder of FIG. 16.
Figure 21:
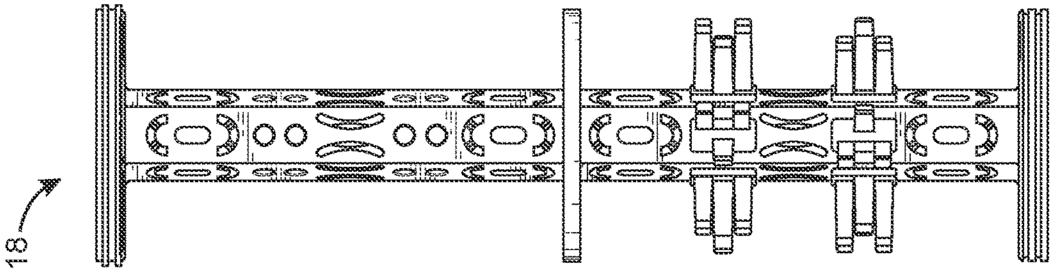
FIG. 21 is a second side view of the tube holder of FIG. 3.
Figure 20:
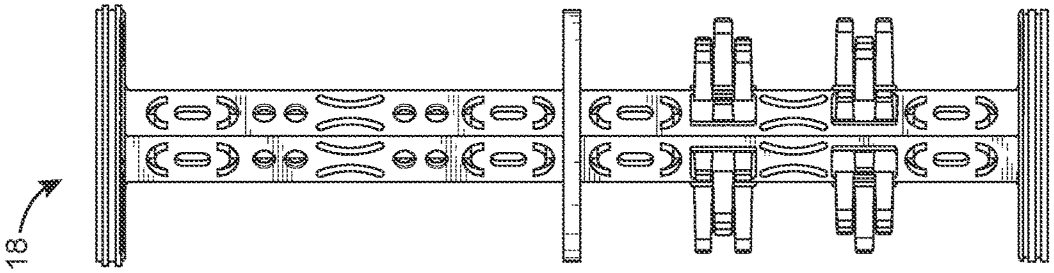
FIG. 20 is a first side view of the tube holder of FIG. 3.
Figure 19:
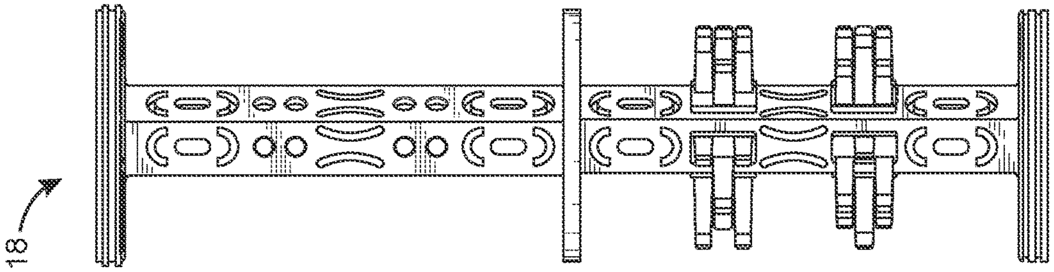
FIG. 19 is a rear view of the tube holder of FIG. 3.
Figure 18:
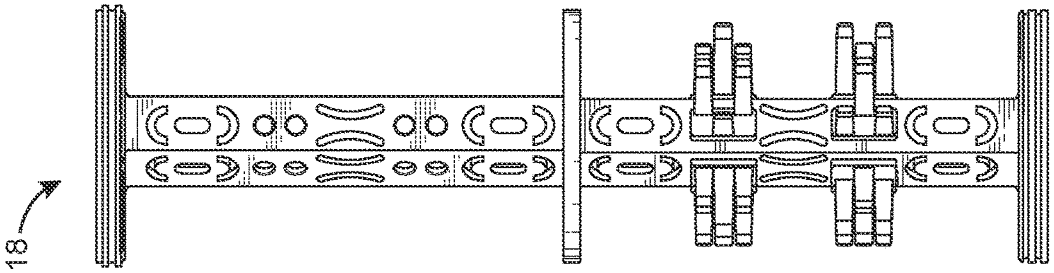
FIG. 18 is a front view of the tube holder of FIG. 3.
Figure 22:
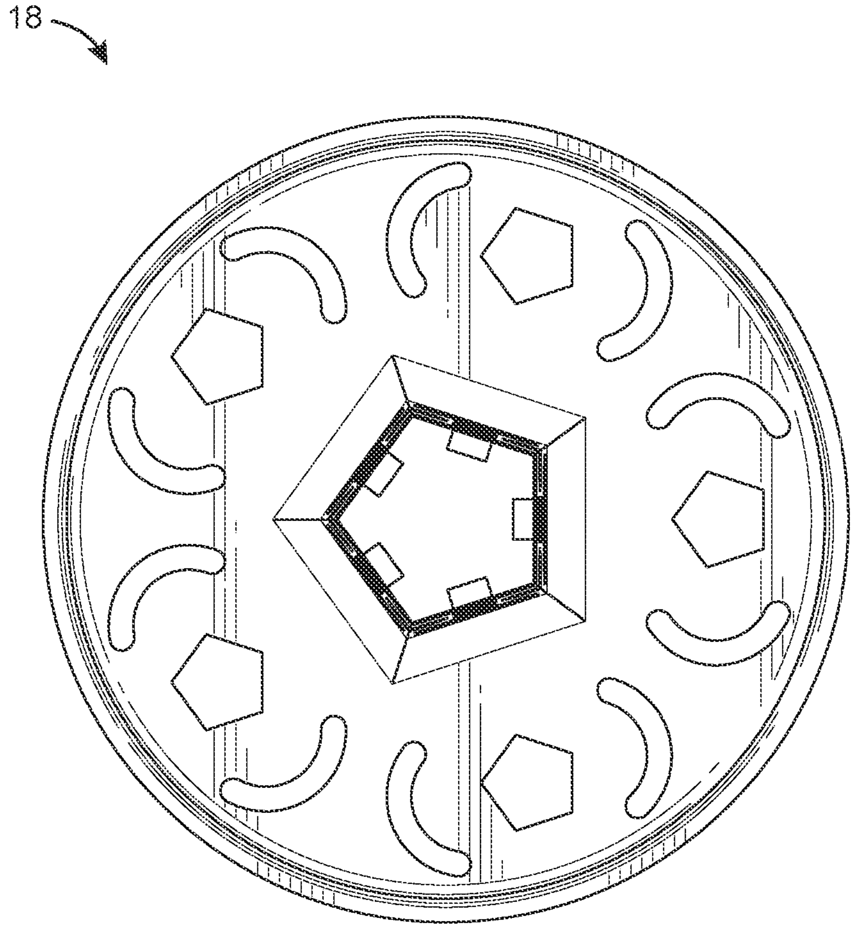
FIG. 22 is a top view of the tube holder of FIG. 3, and is also identical to a bottom view of the tube holder of FIG. 3.

FIG. 17 illustrates a first tube holder 318*a* and a second tube holder 318*b*, each of which include the same features as the tube holder 318. The first tube holder 318*a* and the second tube holder 318*b* are coupled together by a coupling mechanism 350. The coupling mechanism 350 may include a bayonet style-connection, a plurality of fasteners, magnets, or the like. In some embodiments, the coupling mechanism 350 may include a first portion (not shown) integrally formed with the first tube holder 318*a* and a second portion (not shown) integrally formed with the second tube holder 318*b*. In other embodiments, the coupling mechanism 350 may be an independent component, which is coupled to both the first tube holder 318*a* and the second tube holder 318*b*. The illustrated coupling mechanism 350 is located between a second end 338*a* of the first tube holder 318*a* and a first end 334*b* of the second tube holder 318*b*. In some embodiments, there may be an additional tube holder coupled (e.g., by a coupling mechanism) to the first end 334*a* of the first tube holder 318*a*. In other embodiments, there may be an additional tube holder coupled (e.g., by a coupling mechanism) to the second end 338*b* of the second tube holder 318*b*. In yet other embodiments, there may be any number of tube holders coupled together (e.g., by coupling mechanisms).

FIGS. 18-22 further illustrate the tube holder 18.

Various features and advantages are set forth in the following claims.

What is claimed is:

1. A roller mixer system comprising:
- a tube roller including
  - a motor, and
  - a plurality of rollers rotated by the motor; and
- a tube holder including
  - a main shaft defining a shaft width and including a side, the main shaft defining a longitudinal axis of the tube holder,
  - a first end defining a first width, the first width greater than the shaft width,
  - a second end opposite the first end, the second end defining a second width greater than the shaft width, and
  - a clip disposed on the side and configured to receive a tube oriented generally parallel with the longitudinal axis.

2. The roller mixer system of claim 1, wherein the first width and the second width are equal.

3. The roller mixer system of claim 1, wherein the side is a first of a plurality of sides, the plurality of sides further comprising a second side, a third side, a fourth side, and a fifth side.

4. The roller mixer system of claim 3, wherein the clip is a first of a plurality of clips, a second of the plurality of clips disposed on the second side, a third of the plurality of clips disposed on the third side, a fourth of the plurality of clips disposed on the fourth side, and a fifth of the plurality of clips disposed on the fifth side.

5. The roller mixer system of claim 1, wherein the first end and the second end are coaxial.

6. The roller mixer system of claim 1, wherein the first end, the second end, and the main shaft are integrally formed.

7. A tube holder configured to receive a tube, the tube holder comprising:
- a main shaft defining a shaft width and including a side having a mount, the mount including an aperture;
- a first end defining a first width, the first width greater than the shaft width;
- a second end opposite the first end and defining a second width, the second width greater than the shaft width; and
- at least one clip including a protrusion integrally formed with the clip, the clip disposed on the side, the protrusion received in the aperture to couple the at least one clip to the main shaft,
- wherein the at least one clip is configured to receive the tube,
- wherein the tube holder is a first tube holder, and wherein the first tube holder can be selectively coupled to a second tube holder at the first end or the second end.

8. The tube holder of claim 7, wherein the side is a first of a plurality of sides, the plurality of sides further comprising a second side, a third side, a fourth side, and a fifth side.

9. The tube holder of claim 8, further comprising at least one clip disposed on each of the second side, the third side, the fourth side, and the fifth side, each of the clips configured to receive a tube.

10. The tube holder of claim 7, wherein the first width and the second width are equal.

11. The tube holder of claim 7, further comprising a first gasket around the first end and a second gasket around the second end.

12. The tube holder of claim 7, wherein the at least one clip is removably coupled to the side.

13. A tube holder configured to receive a plurality of tubes, the tube holder comprising:
- a main shaft defining a shaft width and including a side, the main shaft defining a longitudinal axis of the tube holder;
- a first end including a first flange extending generally parallel with the longitudinal axis and defining a first width, the first width greater than the shaft width;
- a second end opposite the first end, the second end including a second flange extending generally parallel with the longitudinal axis and defining a second width, the second width greater than the shaft width;
- an intermediate portion disposed between the first end and the second end, the intermediate portion defining an intermediate width, the intermediate width greater than the shaft width;
- a first clip disposed on the side between the first end and the intermediate portion, the first clip configured to receive a first of the plurality of tubes; and
- a second clip disposed on the side between the second end and the intermediate portion, the second clip configured to receive a second of the plurality of tubes,
- wherein the first flange and the second flange extend generally the same distance along the longitudinal axis.

14. The tube holder of claim 13, wherein a distance between the first end and the intermediate portion is equal to a distance between the second end and the intermediate portion.

15. The tube holder of claim 13, further comprising a third clip disposed on the side between the first end and the intermediate portion, and a fourth clip disposed on the side between the second end and the intermediate portion, the third clip configured to receive the first of the plurality of tubes, and the fourth clip configured to receive the second of the plurality of tubes.

16. The tube holder of claim 13, wherein the side is a first of a plurality of sides, the plurality of sides further comprising a second side, a third side, a fourth side, and a fifth side.

17. The tube holder of claim 16, further comprising a first clip disposed on each of the second side, the third side, the fourth side, and the fifth side between the first end and the intermediate portion, and further comprising a second clip disposed on each of the second side, the third side, the fourth side, and the fifth side between the second end and the intermediate portion.

18. The tube holder of claim 13, wherein the first flange is an annular flange extending in a direction away from the intermediate portion, and wherein the second flange is an annular flange extending in a direction away from the intermediate portion.

* * * * *